Nov. 10, 1942.　　　M. G. MANN　　　2,301,730
CABINET
Filed Jan. 23, 1941　　　2 Sheets-Sheet 1

Inventor
Marion G. Mann
By Clarence A. O'Brien
Attorney

Nov. 10, 1942.     M. G. MANN     2,301,730
CABINET
Filed Jan. 23, 1941     2 Sheets-Sheet 2
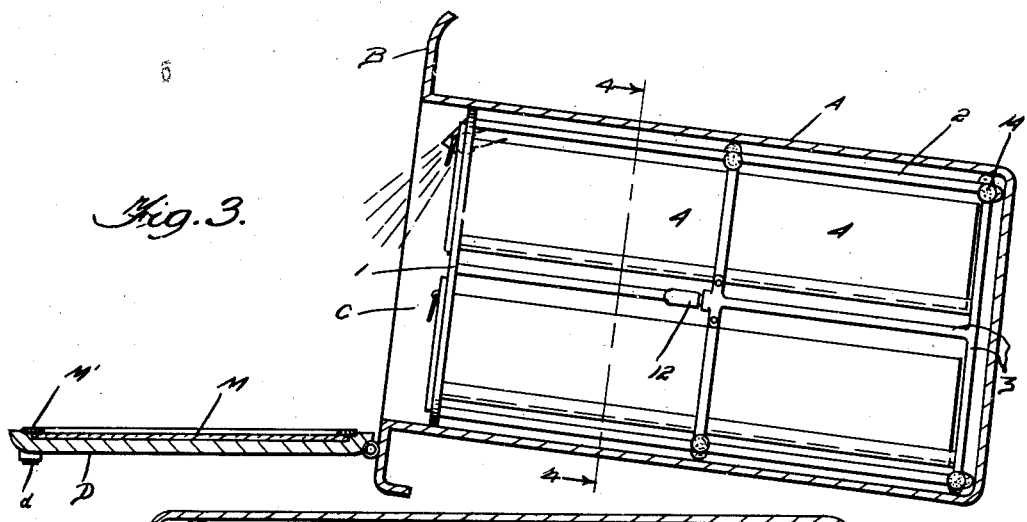
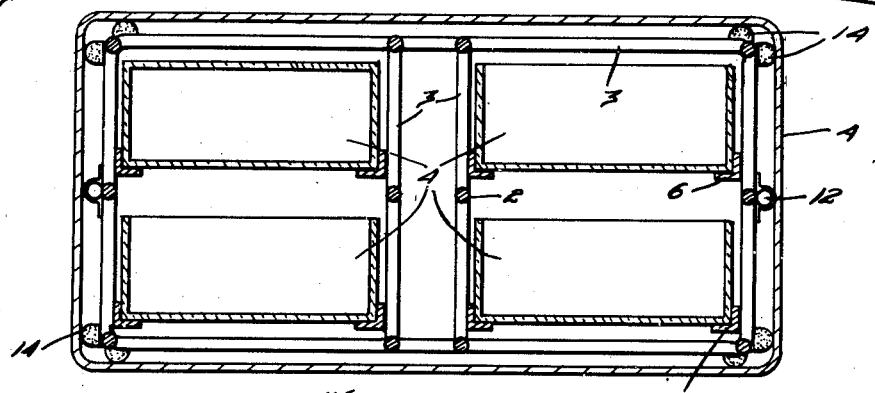
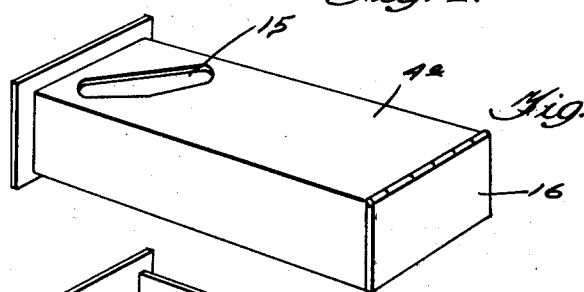
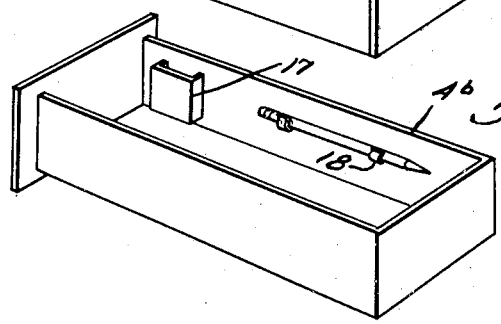
Inventor
Marion G. Mann
By Clarence A. O'Brien
Attorney Patented Nov. 10, 1942

2,301,730

UNITED STATES PATENT OFFICE 2,301,730

CABINET

Marion G. Mann, Horseheads, N. Y.

Application January 23, 1941, Serial No. 375,693

1 Claim. (Cl. 312—150)

This invention relates to a cabinet which is mainly designed to be placed in the glove compartment of an automobile, the general object of the invention being to provide a cabinet provided with a plurality of drawers so that the contents of the glove compartment can be placed in these drawers in an orderly manner so that an occupant of the automobile can readily secure a desired article or articles from the glove compartment.

Another object of the invention is to provide illuminating means for enabling the articles in the drawers to be readily seen.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 3 is a vertical sectional view through the compartment and the cabinet in side elevation.

Figure 4 is a section on the line 4—4 of Figure 3.

Figure 5 is a perspective view of the drawer for holding cleaning tissue.

Figure 6 is a view of the drawer for holding writing material.

In these views a portion of the instrument board of an automobile is shown at B and the glove compartment C is formed of a casing A which extends forwardly from the instrument board and opens out through the instrument board. This compartment is adapted to be closed by a door D hinged to the instrument board at its lower edge and provided with suitable latch means $d$ and in carrying out my invention I place a mirror M on the inner face of the door and provide a strip M' of rubber or the like around the edges of the mirror to protect the same from jars or shocks when the door is being closed.

Figure 1:
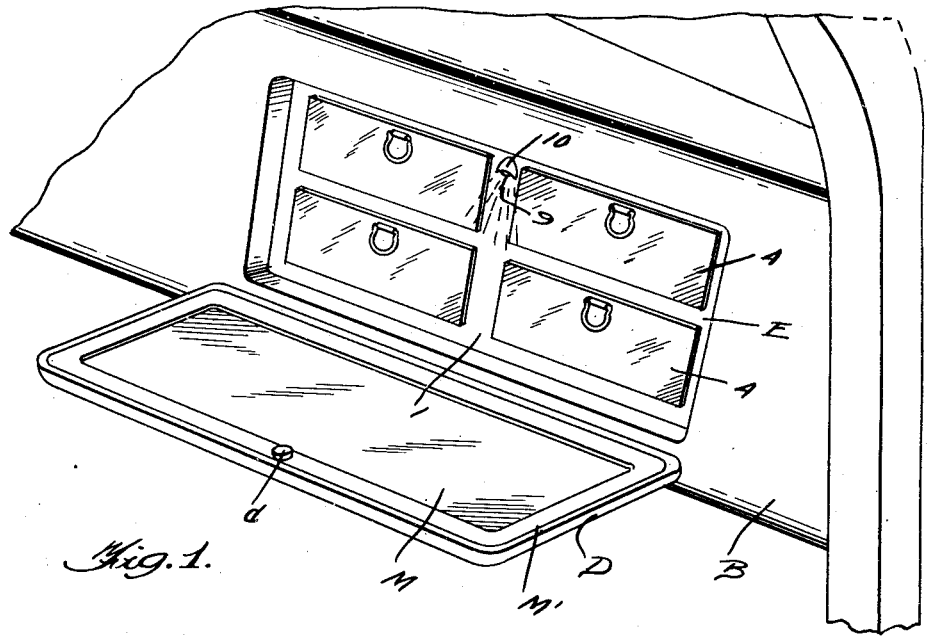
Figure 1 is a fragmentary perspective view of the interior of an automobile body and showing the instrument board with the door of the glove compartment open and showing the improved cabinet in the compartment.

The improved cabinet is shown generally at E and fits snugly in the compartment with its front spaced from the front opening of the compartment as shown in Figures 1 and 3. This cabinet includes a front member 1 which is of a size to snugly fit in the casing which forms the compartment and this front may be formed of any suitable material but preferably is formed of plastic material now on the market. Longitudinally extending bars 2 of metal or other suitable material have the front ends connected with the front member 1 and these bars are connected to cross bars 3 so as to form a skeleton frame of rectangular shape to receive the drawers 4 passing through holes or opening 5 formed in the front member 1. These drawers slide on strips 6 of angle shape in cross section and these drawers can also be formed of any suitable material and at the front end said drawers are equipped with handles 7.

A bracket 8 is supported at the top of the skeleton frame and centrally thereof and supports an electric light socket, the rays of light from the bulb 9 of which pass through an opening formed in the front member 1 and a reflector 10 carried by the front member reflects the rays of light downwardly and outwardly so that the contents of the opened drawers will be illuminated as well as the front of the compartment C. Bulb sockets 11 are also attached to the sides of the skeleton frame and carry the lamp bulbs 12 for illuminating the lower drawers and, of course, suitable switch means are provided for the circuits of the lamps. Also, resilient members 14 are attached to certain parts of the skeleton frame to engage the casing A when the cabinet is placed therein, these resilient members holding the cabinet against movement and thus eliminating noise and preventing damage to the contents of the drawers of the cabinet.

Figure 2:
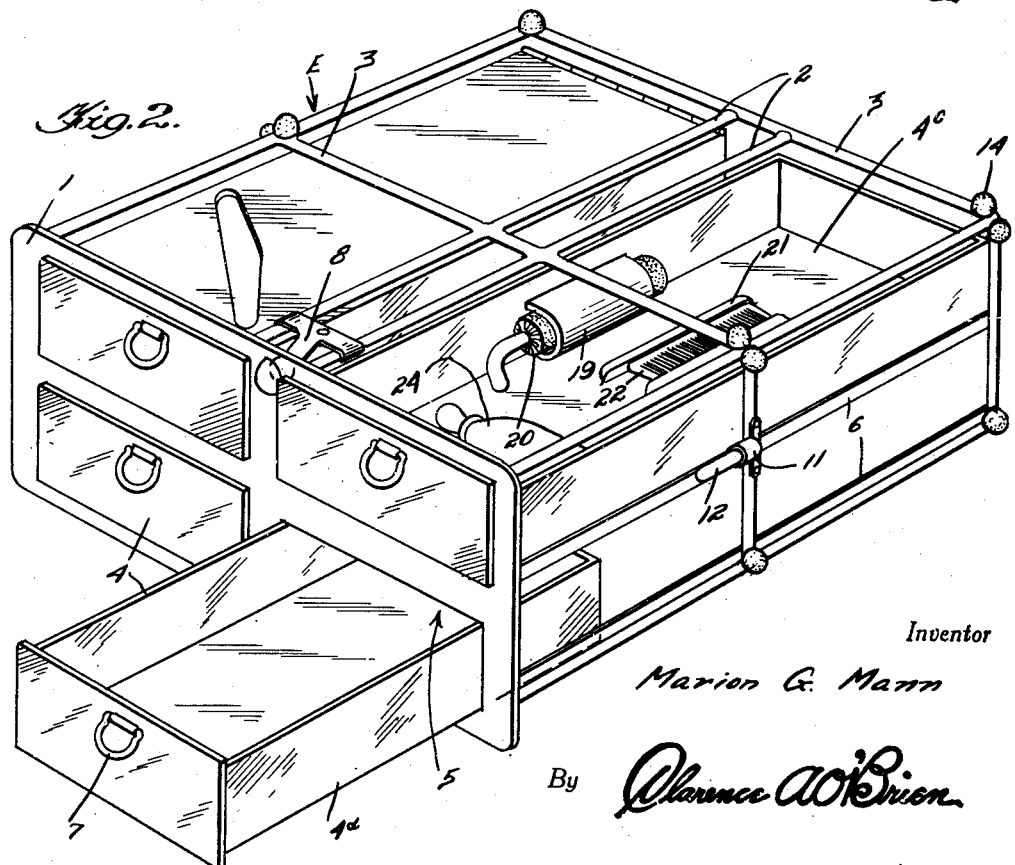
Figure 2 is a perspectivee view of the cabinet removed from the compartment with one of the drawers partly moved outwardly.

As shown in Figures 2 and 5 one of the drawers 4a is formed with a top which has a diagonally arranged opening 15 therein and the rear end of the drawer is open but closed by a door 16. Thus cleaning tissue or the like can be placed in the drawer through this rear opening and it can be removed piece by piece through the opening 15.

Another drawer 4b as shown in Figure 6 is formed with holders 17 and 18 for writing instruments, stamps and the like, and this drawer is adapted to contain envelopes, paper, etc. Another drawer 4c contains a holder 19 for a rotary type of brush 20 and holders 21 for a comb 22 and suitable means for holding a bottle 24 for a cleansing liquid or the like. The other drawer 4d may receive various kinds of articles and any one or all of the drawers can be provided with locks so that they can be locked against unauthorized opening.

From the foregoing it will be seen that I have provided an inexpensive cabinet which can be placed in the glove compartment of an automobile so that the articles to be placed in such compartment can be orderly arranged in the drawers so that they will not be indiscriminately mixed together due to the vibrations of the automobile and by partly opening the drawers one can readily ascertain what each drawer contains as the articles will be illuminated and the articles in most cases are held against movement in the drawers by the various holders.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A frame structure adapted to fit into a glove compartment in an automobile and comprising a front wall having openings therein, an openwork frame carrying tracks for supporting drawers and secured to said wall, conventional drawers resting on said tracks, and resilient knobs on said frame and protruding laterally and vertically therefrom.

MARION G. MANN.